United States Patent
Patil et al.

(10) Patent No.: US 9,191,501 B2
(45) Date of Patent: Nov. 17, 2015

(54) METHOD AND SYSTEM FOR MANAGING CONTACT INFORMATION IN A UNIVERSAL PLUG AND PLAY HOME NETWORK ENVIRONMENT

(75) Inventors: Mayuresh Madhukar Patil, Bangalore (IN); Arun Prasath Ramamoorthy, Bangalore (IN); Je-Young Maeng, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/006,043

(22) PCT Filed: Mar. 19, 2012

(86) PCT No.: PCT/KR2012/001965
§ 371 (c)(1),
(2), (4) Date: Sep. 18, 2013

(87) PCT Pub. No.: WO2012/128527
PCT Pub. Date: Sep. 27, 2012

(65) Prior Publication Data
US 2014/0010358 A1    Jan. 9, 2014

(30) Foreign Application Priority Data
Mar. 18, 2011 (IN) .............................. 839/CHE/2011

(51) Int. Cl.
*H04M 3/42* (2006.01)
*H04M 11/00* (2006.01)
(Continued)

(52) U.S. Cl.
CPC ......... *H04M 3/42136* (2013.01); *H04L 12/282* (2013.01); *H04M 3/42178* (2013.01); *H04M 3/4931* (2013.01); *H04M 1/274516* (2013.01)

(58) Field of Classification Search
CPC .......... H04L 12/282; H04M 1/274516; H04M 3/42136; H04M 3/42178; H04M 3/4931
USPC ............ 379/88.19, 88.2, 88.21, 93.15, 93.23, 379/201.01, 201.02, 218.01
See application file for complete search history.

(56) References Cited

U.S. PATENT DOCUMENTS 6,687,362 B1 *  2/2004  Lindquist et al. ........ 379/218.01
7,187,932 B1 *  3/2007  Barchi .......................... 455/445
(Continued)

FOREIGN PATENT DOCUMENTS

EP            2 424 173          2/2012

OTHER PUBLICATIONS
PCT/ISA/237 Written Opinion issued on PCT/KR2012/001965 (pp. 4).
(Continued)

*Primary Examiner* — Khai N Nguyen
(74) *Attorney, Agent, or Firm* — The Farrell Law Firm, P.C.

(57) ABSTRACT

The present invention provides a method and system for managing contact information in a universal plug and play (UPnP) home network environment. In one embodiment, the present invention provides a method of a telephony server (TS) for providing contact information to a telephony control point (TelCP) in a universal plug and play home network environment. The method includes receiving a request for providing contact information updates associated with at least one contact entry from the TelCP connected to the TS in an UPnP home network environment. The method further includes obtaining the requested contact information updates from an address book associated with the at least one contact entry. The method also includes providing the obtained contact information updates associated with the at least one contact entry to the TelCP.

20 Claims, 16 Drawing Sheets

(51) Int. Cl.
*H04L 12/28* (2006.01)
*H04M 3/493* (2006.01)
*H04M 1/2745* (2006.01)

(56) References Cited

U.S. PATENT DOCUMENTS

| | | | |
|---|---|---|---|
| 8,600,360 B1* | 12/2013 | Patvarczki et al. | 455/414.3 |
| 2002/0156895 A1* | 10/2002 | Brown | 709/226 |
| 2003/0105860 A1* | 6/2003 | Tajima | 709/224 |
| 2005/0022134 A1* | 1/2005 | Tokashiki | 715/764 |
| 2005/0138193 A1 | 6/2005 | Encarnacion et al. | |
| 2005/0249343 A1* | 11/2005 | Birch | 379/142.01 |
| 2006/0015572 A1* | 1/2006 | Tsukamoto | 709/217 |
| 2006/0168344 A1* | 7/2006 | Tsuchiya | 709/245 |
| 2006/0236089 A1* | 10/2006 | Cohen | 713/150 |
| 2006/0246884 A1* | 11/2006 | Ansari | 455/419 |
| 2007/0038720 A1* | 2/2007 | Reding et al. | 709/217 |
| 2007/0136422 A1 | 6/2007 | Ohtani et al. | |
| 2007/0198669 A1 | 8/2007 | Convertino et al. | |
| 2008/0031136 A1* | 2/2008 | Gavette et al. | 370/235 |
| 2008/0050096 A1* | 2/2008 | Ryu | 386/99 |
| 2008/0177626 A1* | 7/2008 | Nguyen | 705/14 |
| 2009/0028179 A1* | 1/2009 | Albal | 370/465 |
| 2009/0157732 A1* | 6/2009 | Hao et al. | 707/102 |
| 2009/0287794 A1* | 11/2009 | Saaranen et al. | 709/219 |
| 2010/0040211 A1 | 2/2010 | Maeng et al. | |
| 2010/0082761 A1* | 4/2010 | Nguyenphu et al. | 709/206 |
| 2010/0208746 A1 | 8/2010 | Rahman | |
| 2010/0284398 A1 | 11/2010 | Maeng et al. | |
| 2011/0145270 A1* | 6/2011 | Christopher et al. | 707/769 |
| 2011/0173223 A1* | 7/2011 | Chitturi et al. | 707/769 |
| 2011/0235790 A1* | 9/2011 | Strope et al. | 379/93.02 |
| 2012/0151006 A1* | 6/2012 | McInerney et al. | 709/219 |
| 2012/0157157 A1* | 6/2012 | Chakra et al. | 455/550.1 |
| 2014/0010358 A1* | 1/2014 | Patil et al. | 379/201.01 |

OTHER PUBLICATIONS

PCT/ISA/210 Search Report issued on PCT/KR2012/001965 (pp. 3).
Mohamed Mandi et al., "New UPnP Service for Multimedia Remote Sharing with IMS Framework", 2010 14th International Conference on Intelligence in Next Generation Networks (ICIN), XP031805052, Oct. 11, 2010.

* cited by examiner

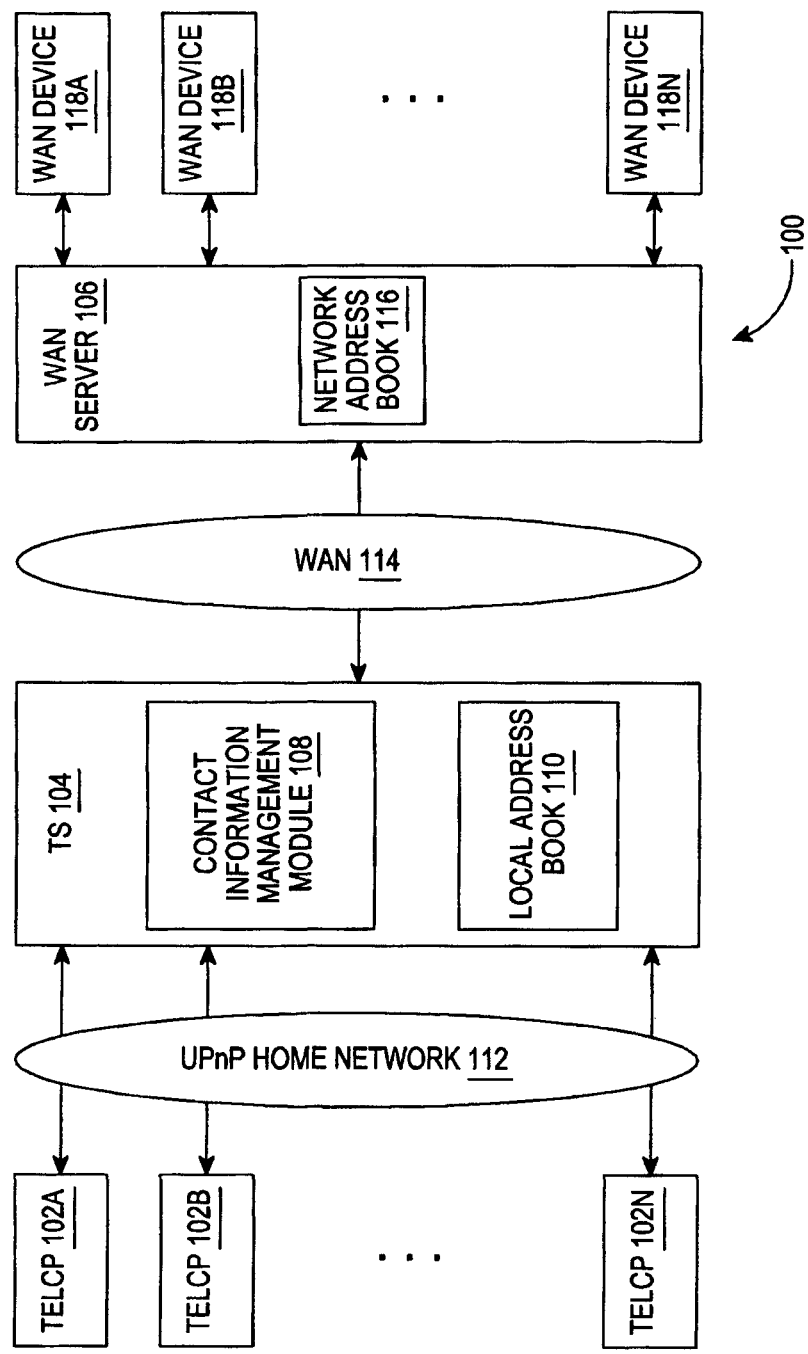

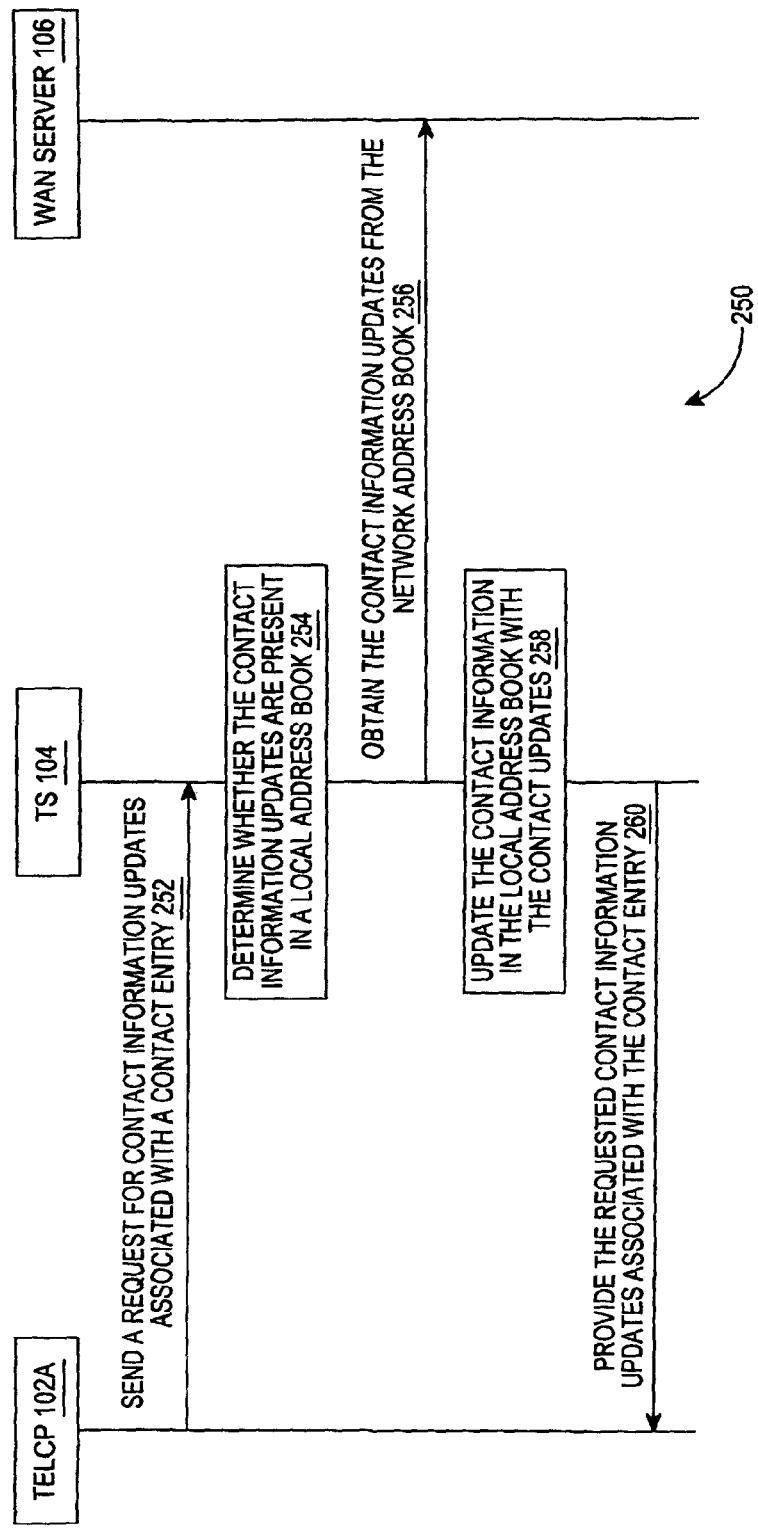

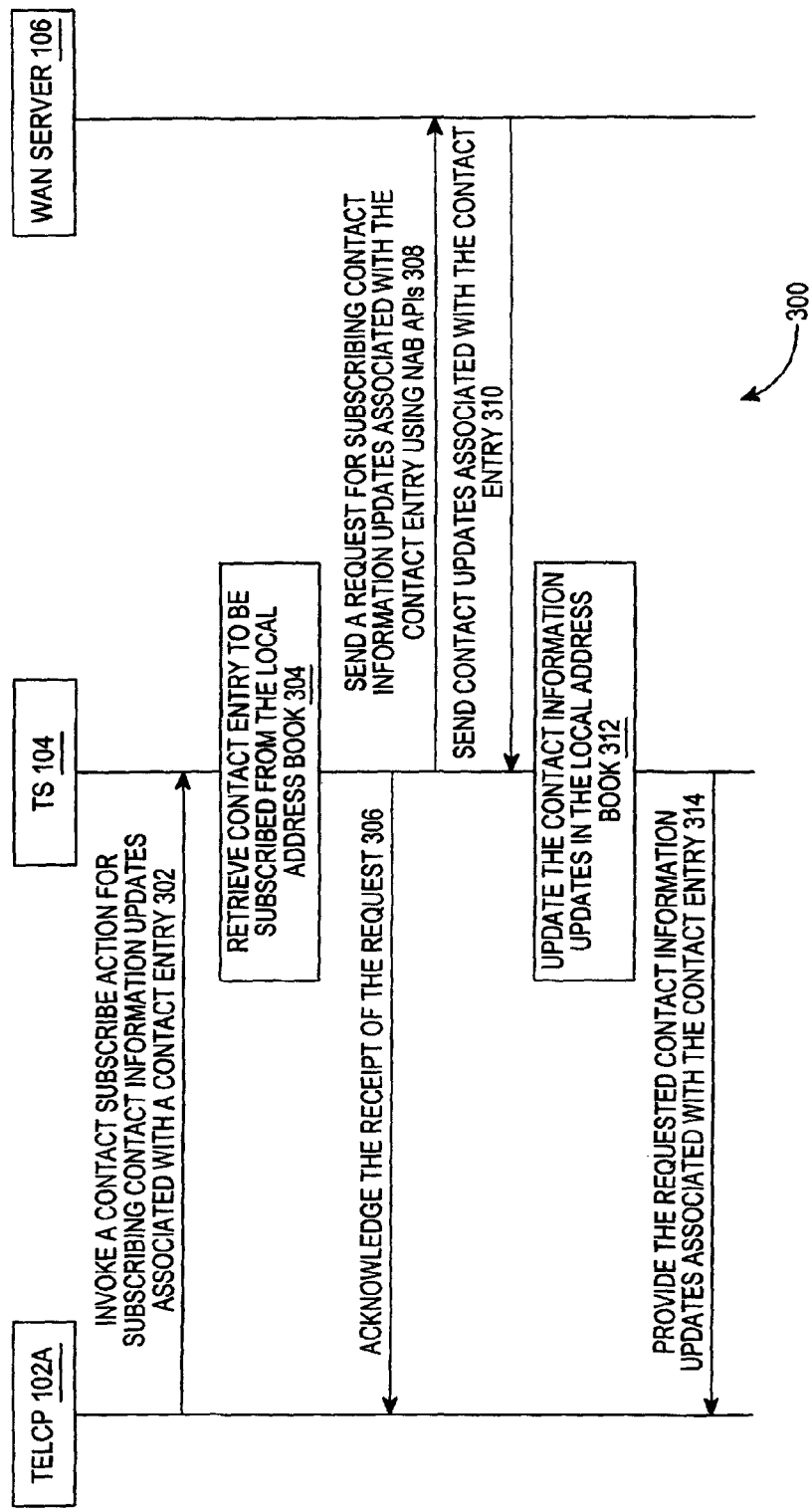

METHOD AND SYSTEM FOR MANAGING CONTACT INFORMATION IN A UNIVERSAL PLUG AND PLAY HOME NETWORK ENVIRONMENT

PRIORITY

This is the national stage of Int'l Pat. App. No. PCT/KR2012/001965, which was filed on Mar. 19, 2012 and claims priority to Indian Pat. App. No. 839/CHE/2011, which was filed on Mar. 18, 2011.

BACKGROUND

1. Field of the Invention

The present invention relates to the field of universal plug and play (UPnP) communication, and more particularly relates to management of contact information in an UPnP home network environment.

2. Description of the Related Art

Recently, UPnP telephony has extended telephony experience in the home. The UPnP telephony also has developed an address book feature in the UPnP telephony called as a Phone data Model. The phone data model is a profiling standard for accessing phone related setting using devices like Television (TV) so that the user can access the phone settings using the TV device. The TV acts as a telephony control point (TelCP) to control phone related setting in a telephony server (TS) (e.g., mobile phone).

The phone data model also defines an address book which enables the user to manage the address book from the TCP devices like TV. A configuration management service (CMS) is defined by the UPnP forum allows the user to access the address book for adding a new contact entry, deleting existing contact entry, and browsing contacts.

However, the TS does not allow the TelCP provides notification in case contact information associated with contacts is updated in an address book. Also, the TS does not allow the TelCP to share personal contact card with a remote party (e.g., WAN user).

SUMMARY OF THE INVENTION

The present invention provides a method and system for managing contact information in a universal plug and play (UPnP) home network environment. In one aspect, the present invention provides a method of a telephony server (TS) for providing updates to contact information to a telephony control point (TelCP) in a universal plug and play home network environment. The method includes receiving a request for providing contact information updates associated with at least one contact entry from the TelCP connected to the TS in an UPnP home network environment. The method further includes obtaining the requested contact information updates from an address book associated with the at least one contact entry. The method also includes providing the obtained contact information updates associated with the at least one contact entry to the TelCP.

In another aspect, a telephony server includes a processor, a communication interface coupled to the processor, and a memory coupled to the processor. The memory includes a contact information management module for performing the above described method.

In yet another aspect, a non-transitory computer-readable storage medium having instructions stored therein, that when executed by a telephony server, cause the telephony server to perform the method described above.

In further another aspect, a method of a TS for sharing a personal contact card of a UPnP user with a remote party includes receiving a request for a personal contact card associated with a user of a TelCP in a UPnP home network environment from a wireless area network (WAN) device, and determining whether the personal contact card is to be shared with the user of the WAN device. If the personal contact card is to be shared with the user of the WAN device, the method includes sending the personal contact card associated with the user of the TelCP with the WAN device. Otherwise, the method includes returning an error message to the WAN device.

In yet a further aspect, a telephony server includes a processor, a communication interface coupled to the processor, and a memory coupled to the processor. The memory includes a contact information management module for performing the above described method.

In still another aspect, a non-transitory computer-readable storage medium having instructions stored therein, that when executed by a telephony server, cause the telephony server to perform the method described above.

Other features of the embodiments will be apparent from the accompanying drawings and from the detailed description that follows.

The present invention provides a method and system for managing contact information in a universal plug and play (UPnP) home network environment.

BRIEF DESCRIPTION OF DRAWINGS

FIG. 1 is a block diagram of a system for managing contact information in a universal plug and play (UPnP) home network environment, according to one embodiment.

FIG. 2b is a flow diagram illustrating an exemplary method of providing contact information updates associated with a contact entry to the TelCP, according to another embodiment.

FIG. 3 is a flow diagram illustrating an exemplary method of subscribing to contact information updates associated with a contact entry, according to one exemplary implementation.

Figure 2A:
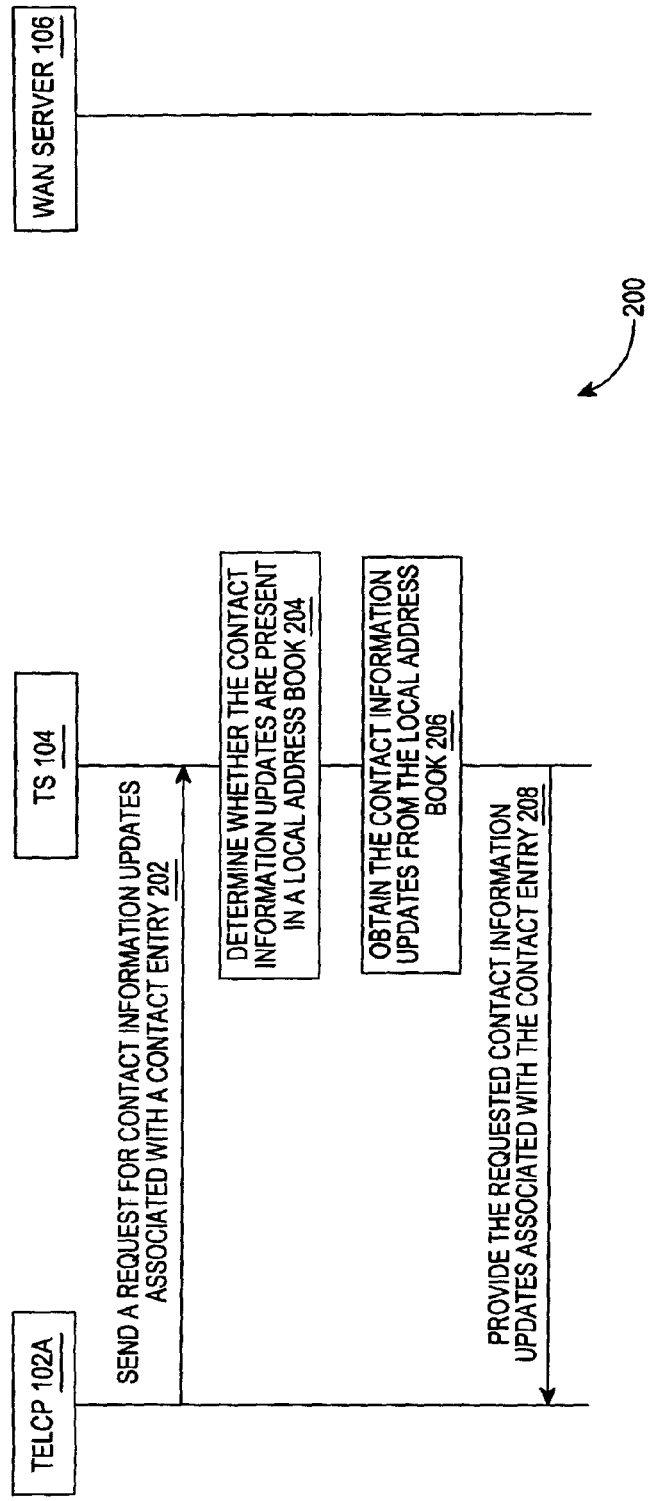
FIG. 2a is a flow diagram illustrating an exemplary method of providing contact information updates associated with a contact entry to a Telephony Control Point (TelCP), according to one embodiment.

The drawings described herein are for illustration purposes only and are not intended to limit the scope of the present disclosure in any way.

DETAILED DESCRIPTION OF EMBODIMENTS OF THE PRESENT INVENTION

The present invention provides a method and system for managing contact information in a universal plug and play home network environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms 'contact information updates' and 'update to the contact information' are used interchangeable throughout the document.

FIG. 1 is a block diagram of a system 100 for managing contact information updates in a universal plug and play home network environment, according to one embodiment. In FIG. 1, the system 100 includes telephony control points 102A-N, a telephony server 104, a wireless area network (WAN) server 106, and WAN devices 118A-N. The TS 104 includes contact information management module 108 and a local address book 110. The WAN server 106 includes a network address book 116 associated with one or more TelCPs 102A-N. A network address book may be a service provider address book (e.g., a converged address book (CAB) by Open Mobile Alliance Enablers) or a social network address book associated with social networking sites, such as Facebook®, Orkut®, Friendster®, MySpace®, Twitter®, and so on, storing contact entries associated with entities linked to users of the TelCPs 102A-N. As shown, the TelCPs 102A-N are connected to the TS 104 via a UPnP home network 112. The TS 104 is connected to the WAN server 106 via a WAN 114.

In an exemplary operation, consider that the TelCP 102A requests the TS 104 to provide contact information updates associated with a contact entry in the local address book 110/the network address book 116. The contact entry in the local address book 110/network address book 116 may be associated with another TelCP user or a WAN user. The user of the TelCP 102A sends a request for subscribing contact information updates associated with one or more contact entry so that the TelCP user can stay up-to-date with the contact information associated with the contact entries in his/her address book. In an exemplary implementation, when the TelCP 102A wishes to subscribe contact information updates associated with the contact entries, the TelCP 102A invokes ContactSubscribe( ) action with arguments ContactstoSubscribe and ContactInfo for requesting the TS 104 to send the contact information updates associated with the contact entry. Similarly, for unsubscribing the contact information updates associated with the contact entry, the TelCP 102A invokes ContactUnsubscribe( ) action with argument ContactstoUnsubscribe. Accordingly, the TS 104 maintains subscription request information in a state variable called "SubscribedContacts" which carries all the information regarding the subscription of contact information updates. Exemplary structure for "SubscribedContacts" is depicted in APPENDIX 'A'.

Based on the request, the contact information management module 108 obtains contact information updates associated with the contact entry from the local address book 110 or the network address book 116. The minimum information required for obtaining the contact information updates includes the contact ID of the contact entry, state of the subscription, and contact information updates to be obtained. Accordingly, the TS 104 provides the obtained contact information updates to the TelCP 102A via the UPnP home network 112.

In one embodiment, the contact information management module 108 subscribes to the contact information updates associated with the contact entry so that the subscribed contact information updates can be provided to the TelCP 102A when any updates are made to the contact information associated with the contact entry as shown in FIG. 3. For example, the user of TelCP 102 can automatically receive contact information updates from the TS 104 upon the changes to the contact entry in the local address book 110/the network address book 116. The changes to the contact entry may include change in a telephony number, change in the status and/or change in a display image of any of the contact entries associated with the user of the TelCP 102A.

Figure 4:
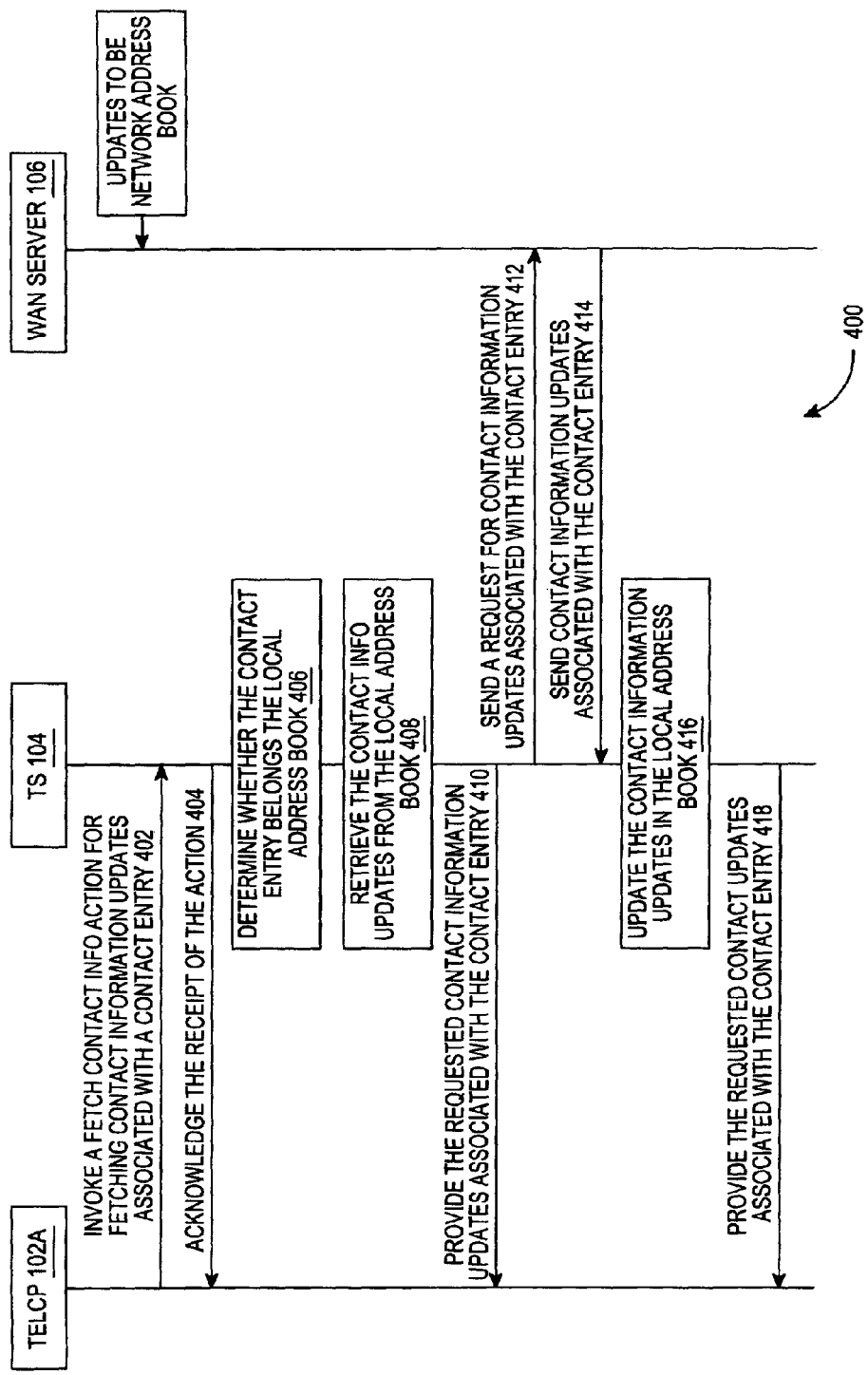
FIG. 4 is a flow diagram illustrating an exemplary method of fetching contact information updates associated with a contact entry, according to another exemplary implementation.

In another embodiment, the contact information management module 108 fetches the contact information updates associated with the contact entry from the local address book 110/the network address book 116 upon receiving the request from the TelCP 102A and provides the fetched contact information updates to the TelCP 102A as illustrated in FIG. 4. For example, the contact information management module 108 fetches the contact information updates from the local address book 110/the network address book 116 when the TS 104 is a mobile phone due to high cost involved in the wireless data communication. In an exemplary implementation, the TS 104 may fetch the contact information updates from the network address book 116 using 'FetchContactInfo( )' action with input arguments 'TargetContacts' and 'ShareInfo'. The input argument 'TargetContacts' contain target contact identifiers associated with contact entry having reference to the local address book 110 for which contact information updates needs to be fetched. Exemplary structure of the input argument 'TargetContacts' is depicted in APPENDIX 'B'. The input argument 'ShareInfo' contains a list of contact information elements to be fetched. This input argument can contain empty string in case entire contact information is to be fetched from the local address book 110. For example, the contact information management module 108 checks for the contact entry in the local address book 110 and identifies the network address book 116 for the corresponding contact entry. Then, the contact information management module 108 initiates a fetch contact information updates request to the WAN server 106 having the network address book 116 where the target contact entry is stored. Once, the contact information updates associated with the contact entry are fetched from the network address book 116, then the contact information management module 108 updates the local address book 110 with the contact information updates associated with the contact entry and provides the contact information updates associated with the contact entry to the TelCP 102A.

In another exemplary operation, consider that the WAN device 118A sends a request for a personal contact card (PCC) associated with a user of the TelCP 102A to the TS 104 via the WAN server 106. A PCC basically defines own profile information of a TelCP user. It is appreciated that, the WAN device 118A may also send a request for contact invitation or contact sharing to the TS 104 instead of the request for the PCC. The TS 104 uses a new state variable for handling the request for sharing the PCC associated with the TelCP user. Exemplary state variable used for handling the request for sharing a PCC associated with a TelCP user is depicted in 'APPENDIX C'. The format of the incoming requests state variable is an XML document. The state variable includes information associated with the request for sharing the PCC including but not limited to type of incoming request, initiator of the request, unique resource locator point to the contact entry, and unique request identifier.

When the request is received, the TS 104 changes the state variable and notifies regarding the request for sharing the PCC to the TelCPs 102A-N. Accordingly, the user of the TelCPs 102A-N accepts or rejects the request to share the PCC with the user of the WAN device 118A. In some cases, the user of the TelCPs 102A-N may accept the request for PCC share but may filter the information in the PCC to be shared with the WAN user. For example, the TelCPs 102A-N may accept or reject the request for sharing the PCC by invoking Accept( ) or Reject( ) action. If the user of the TelCPs 102A-N accepts the request to share the PCC, then the contact information management module 108 obtains the PCC from the local address book 110/the network address book 112 and sends the PCC associated with the user of the TelCPs 102A-N to the user of the WAN device 118A via the WAN server 106. If the user of the TelCPs 102A-N rejects the request to share the PCC, then the contact information management module 108 sends an error message indicating failure to process the request for PCC to the user of the WAN device 118A.

In one exemplary implementation, the TelCP 102A invokes GetValues( ) with parameter arguments as depicted in APPENDIX 'D'. Consequently, the GetValues( ) returns the ParametersValueList output argument which returns the PCC information in the contact element as shown in APPENDIX 'E'.

FIG. 2A is a flow diagram 200 illustrating an exemplary method of providing contact information updates associated with at least one contact entry to the TelCP 102A, according to one embodiment. At step 202, the TelCP 102A sends a request for subscribing contact information updates associated with at least one contact entry. At step 204, the TS 104 determines whether the contact information updates associated with the contact entry are available in the local address book 110. If the contact information updates are stored in the local address book 110, then at step 206, the TS 104 obtains the contact information updates from the local address book 110. At step 208, the TS 104 sends the contact information updates associated with the contact entry to the TelCP 102A.

FIG. 2B is a flow diagram 250 illustrating an exemplary method of providing contact information updates associated with at least one contact entry to the TelCP 102A, according to another embodiment. At step 252, the TelCP 102A sends a request for contact information updates associated with a contact entry. At step 254, the TS 104 determines whether the contact information updates associated with the contact entry are available in the local address book 110.

If the contact entry is not available in the local address book 110, then at step 256, the TS 104 obtains the contact information updates from the network address book 116. At step 258, the TS 104 updates the local address book 110 with the contact information updates associated with the contact entry. At step 260, the TS 104 provides the requested contact information updates associated with the contact entry to the TelCP 102A.

FIG. 3 is a flow diagram 300 illustrating an exemplary method of subscribing to contact information updates associated with a contact entry, according to one exemplary implementation. At step 302, the TelCP 102A invokes a contact subscribe action with input arguments 'contactstosubscribe' and 'contactinfo' for subscribing contact information updates associated with the contact entry. At step 304, the TS 104 retrieves the contact entry for which the contact information updates is subscribed from the local address book 110. Additionally, the TS 104 maintains the subscribed contact entry information in a 'subscribed contact' state variable as described above. At step 306, the TS 104 acknowledges the receipt of the contact subscribed request invoked through the contact subscribe action.

If the contact entry does not belong to the local address book 110, then the TS 104 sends a request for subscribing contact information updates associated with the contact entry using network address book application programming interfaces (NAB APIs), at step 308. At step 310, the WAN server 106 sends contact information updates associated with the contact entry to the TS 104 when any changes are made to the contact information associated with the contact entry. At step 312, the TS 104 updates the contact information updates associated with the contact entry in the local address book 110. At step 314, the TS 104 provides the requested contact information updates associated with the contact entry to the TelCP 102A.

FIG. 4 is a flow diagram 400 illustrating an exemplary method of fetching contact information updates associated with a contact entry, according to another exemplary implementation. At step 402, the TelCP 102A invokes a FetchContactInfo action for fetching contact information updates associated with the contact entry. The Fetch Contact Info action enables the TelCP 102A to fetch the updated information of the contact entry identified by the input argument TargetContacts from the network address book 116. As described above, this action has two input arguments 'TargetContacts' and 'ShareInfo'.

The input argument 'TargetContacts' contain the target contact identifiers for which the contact updates needs to be fetched. The 'Targetcontacts' includes reference to the contact entry in the local address book 110. The example structure for input argument 'TargetContacts' is shown in the APPENDIX 'B'. The input argument 'ShareInfo' contains a list of contact information elements to be fetched (e.g., name, email etc.). The input argument 'ShareInfo' contains comma separated contact information element. The input argument 'ShareInfo' can contain empty string to share entire contact information from the local address book 110.

At step 404, the TS 104 acknowledges the receipt of the request for fetching contact information updates. At step 406, the TS 104 determines whether the contact entry for which the contact information updates is to be fetched belongs to the local address book 110. At step 408, the TS 104 retrieves the contact information updates from the local address book 110. At step 410, the TS 104 sends the contact information updates associated with the contact entry to the TelCP 102A.

If the contact entry does not belong to the local address book 110, then at step 412, the TS 104 sends a request for fetching the contact information updates from the network address book 116. At step 414, the WAN server 106 sends the contact information updates associated with the contact entry in response to the request. At step 416, the TS 104 updates the local address book 110 with the fetched contact information updates. At step 418, the TS 104 provides the requested contact information updates associated with the contact entry to the TelCP 102A.

Figure 5:
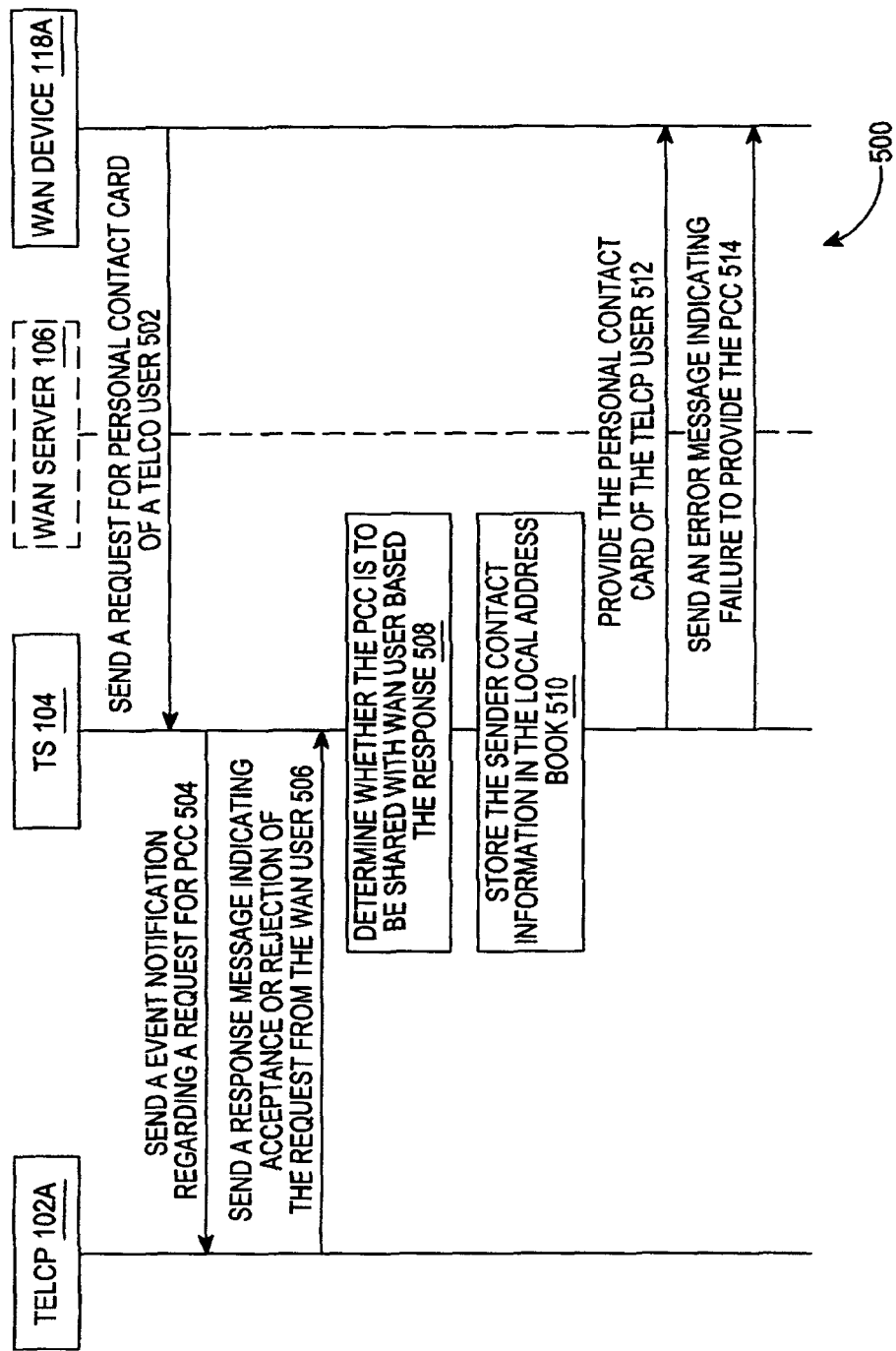
FIG. 5 is a flow diagram illustrating an exemplary method of sharing a personal contact card of a TelCP user, according to one embodiment.

FIG. 5 is a flow diagram 500 illustrating an exemplary method of sharing a personal contact card of a TelCP user, according to one embodiment. At step 502, the WAN device 118A sends a request for a personal contact card (PCC) associated with the user of the TelCP 102A. At step 504, the TS 104 sends a notification regarding a request for sharing the PCC to the TelCP 102A. For example, the notification is carried via a new state variable "IncomingRequests" for handling incoming PCC share request or Incoming Contact Subscription or Contact Invitation request. Generally, there can be three different kinds of incoming requests (Contact Subscription, PCC sharing, and Contact Invitation) possible from the remote party. The contact sharing request is received by the TS 104 when a remote party (e.g., WAN user) wishes to share a set of contact information. The PCC information sharing request is received by the TS 104 when the WAN user requests for the PCC information of the TelCP user or wishes to subscribe to a contact entry. The contact invitation is mutual sharing of contact information between two parties. The state variable 'IncomingRequests' stores the incoming PCC share request, and as this state variable is changed, the TS 104 events out the changed state variable to the TelCP 102A.

At step 506, the TelCP 102A sends a response message indicating acceptance or rejection of the request from the WAN user. The TelCP 102A can accept or reject the incoming request by invoking an accept( ) or reject( ) action. For example, when the incoming request is evented by the TS 104 via the state variable 'IncomingRequest', the TelCP 102A can accept or reject the particular request by invoking the accept( ) or reject( ) action.

At step 508, the TelCP 102A determines whether the PCC is to be shared with the WAN user based on the response message. At step 510, the TS 104 stores the sender contact information in the local address book 110. At step 512, the TS 104 sends the PCC associated with the TelCP 102A to the WAN device 118A if the TelCP 102A accepts the request to share the PCC via the network address book 110 or as a message. Otherwise, at step 514, the TS 104 sends an error message indicating failure to share the PCC associated with the TelCP user to the WAN device 118A so that the WAN device 118A displays the error message to the WAN user.

Moreover, in one embodiment, a non-transitory computer-readable storage medium having instructions stored therein, that when executed by the TS 104, cause the TS 104 to perform the method illustrated in FIGS. 2A through 5.

Figure 6:
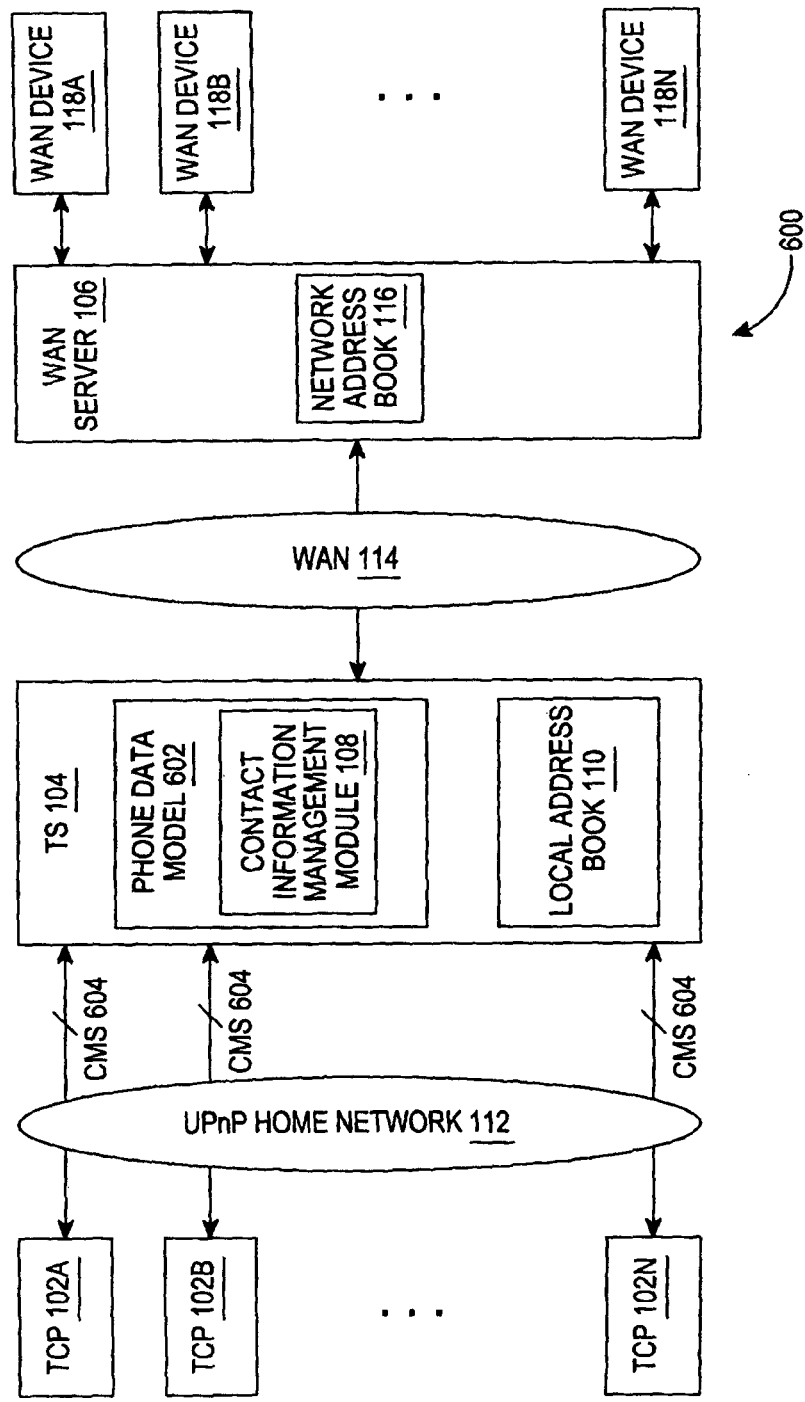
FIG. 6 illustrates a block diagram of an exemplary system for managing the contact information updates in an UPnP home network environment using a configuration management service (CMS) interface, according to one embodiment.

FIG. 6 illustrates a block diagram of a system 600 for managing the contact information in a UPnP home network environment using a configuration management service (CMS) interface 604, according to one embodiment. As per the embodiment illustrated in FIG. 6, the TS 104 includes a phone data model 602 with the contact information management module 108. The contact information management module 108 is an extension to a currently known phone data model in the TS 104. This can be achieved by extending address book functionality to the phone data model 602 so as to enable the user to use advanced address book features such as sharing of PCC and subscribing to contact information updates. Thus, for subscribing contact information updates or sharing a PCC, the TelCP 102A uses existing actions in the CMS interface 604. The contact information management module 108 in the phone data model 602 manages contact information in the UPnP home network environment, according to one or more embodiments described in FIGS. 1-5.

Figure 7:
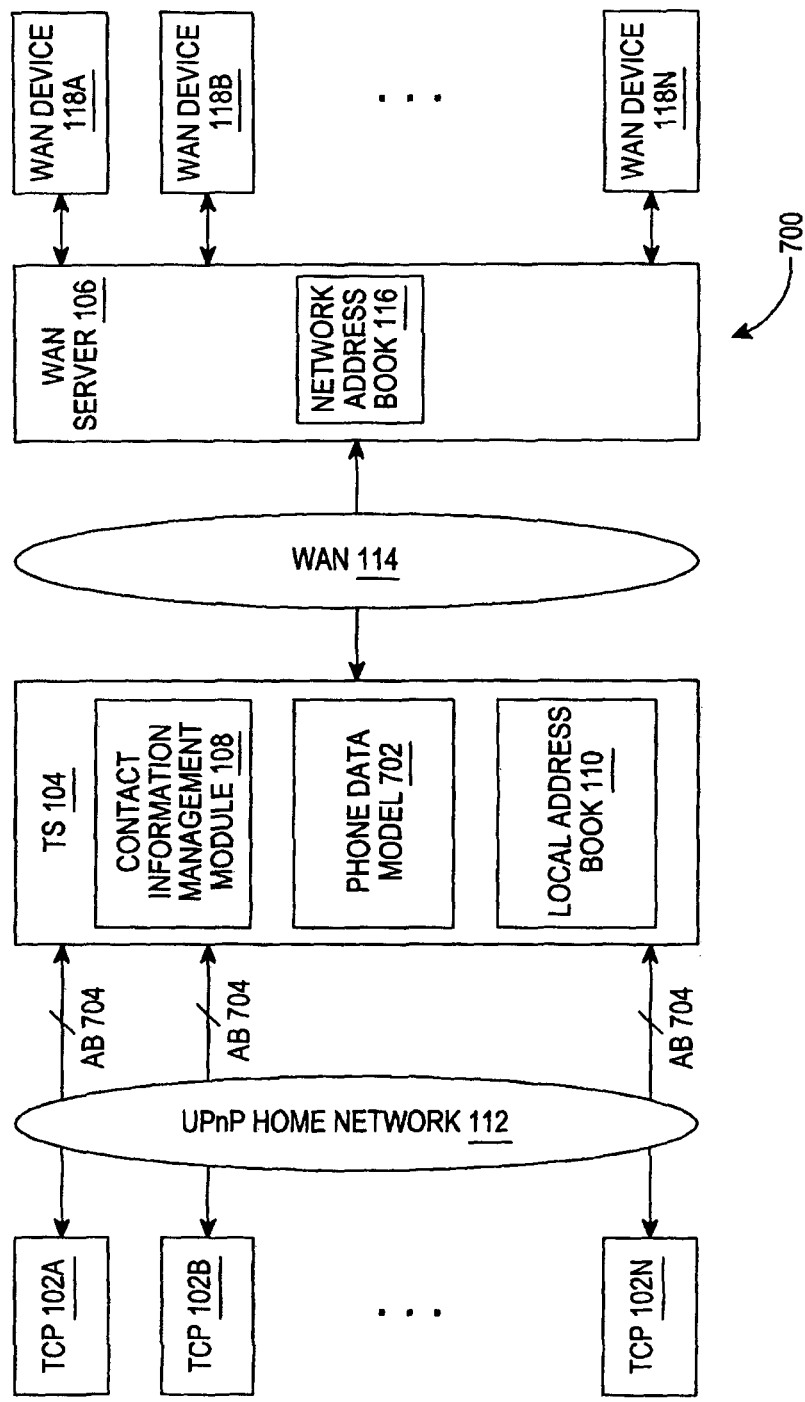
FIG. 7 illustrates a block diagram of an exemplary system for managing the contact information updates in an UPnP home network environment using an address book interface, according to another embodiment.

FIG. 7 illustrates a block diagram of an exemplary system 700 for managing the contact information in an UPnP home network environment using an address book interface 704, according to another embodiment. As per the embodiment illustrated in FIG. 7, the TS 104 includes a phone data model 702 and the contact information management module 108. The contact information management module 108 uses the address book interface 704 to manage contact information in the UPnP home network environment without extending the phone data model 702, according to one or more embodiments described in FIGS. 1-5.

Figure 8:
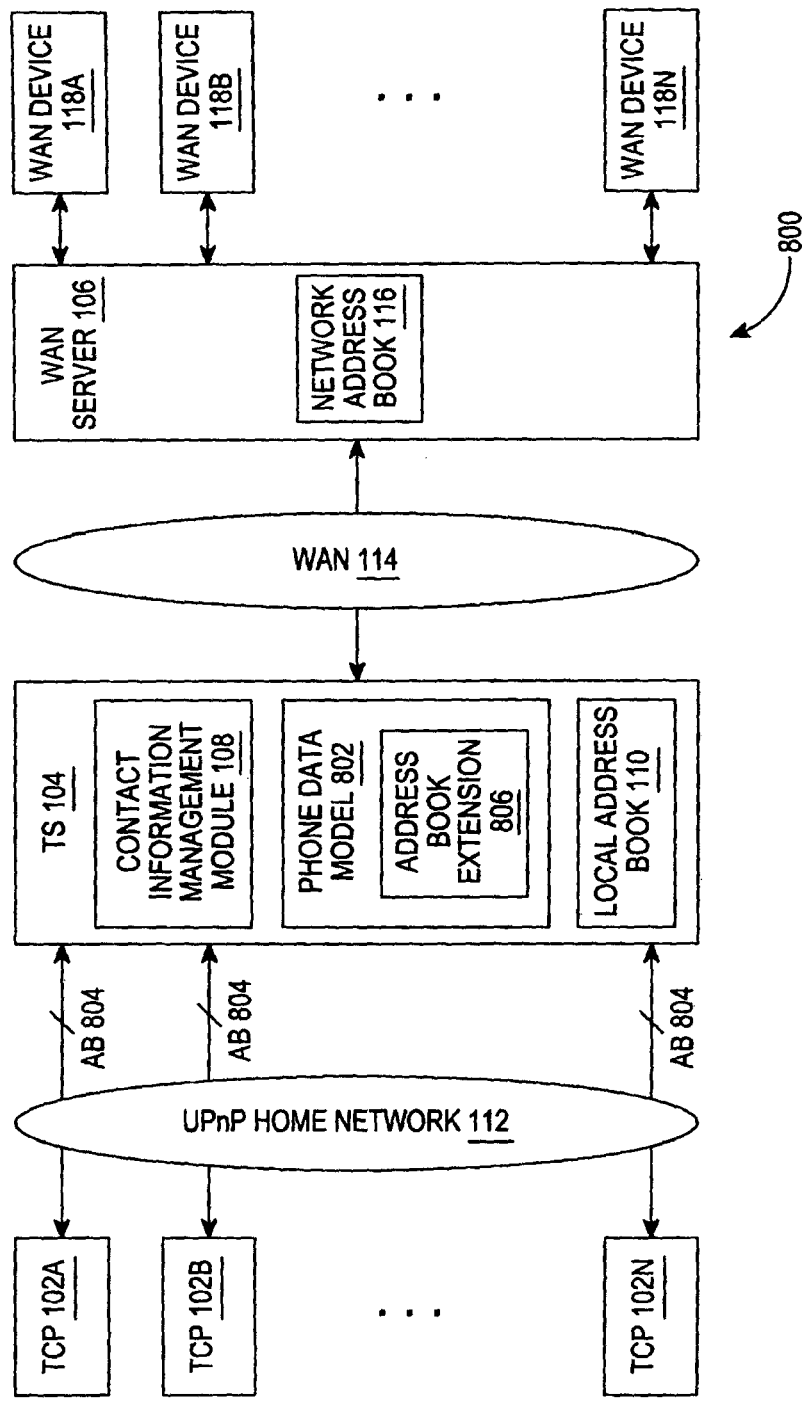
FIG. 8 illustrates a block diagram of an exemplary system for managing the contact information updates in an UPnP home network environment using an address book interface, according to yet another embodiment.

FIG. 8 illustrates a block diagram of an exemplary system 800 for managing the contact information in an UPnP home network environment using an address book interface 804, according to yet another embodiment. As per the embodiment illustrated in FIG. 8, the TS 104 includes a phone data model 802 and the contact information management module 108. In the system 800, the phone data model 802 is extended to provide simple address book functionality such as updating contact entries in the network address book 116 and searching contact entries using address book extensions 806. Whereas the contact information management module 108 is used to provide advanced address book functionalities such as providing updated contact information and sharing personal contact cards.

Figure 9:
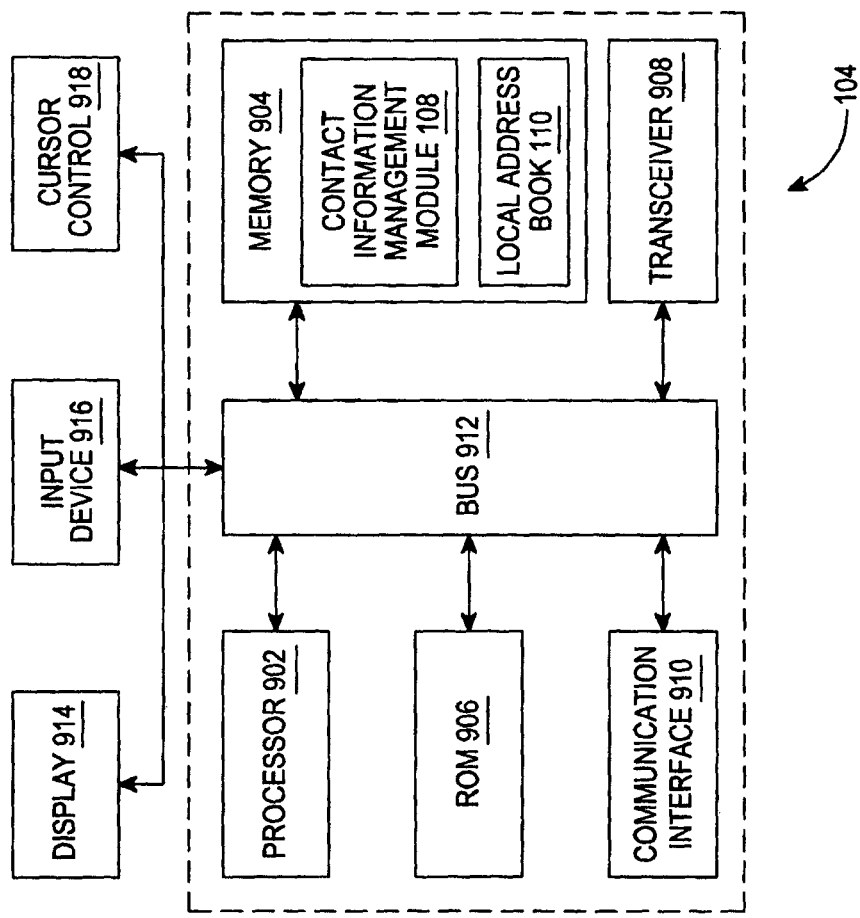
FIG. 9 illustrates a block diagram of a Telephony Server (TS) showing various components for implementing embodiments of the present subject matter.

FIG. 9 illustrates a block diagram of the TS 104 showing various components for implementing embodiments of the present subject matter. In FIG. 9, the TS 104 includes a processor 902, memory 904, a read only memory (ROM) 906, a transceiver 908, a bus 910, a communication interface 912, a display 914, an input device 916, and a cursor control 918.

The processor 902, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as generic or programmable logic devices or arrays, application specific integrated circuits, single-chip computers, smart cards, and the like.

The memory 904 may be volatile memory and non-volatile memory. The memory 704 includes the contact information management module 108 in the form of instructions stored therein to managing contact information in the UPnP home network environment, according to the embodiments of the present subject matter. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling memory cards, Memory Sticks™, and the like.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 902. For example, a computer program may include machine-readable instructions capable of managing contact information in an UPnP domain, according to the teachings and herein described embodiments of the present subject matter. In one embodiment, the computer program may be included on a storage medium and loaded from the storage medium to a hard drive in the non-volatile memory.

The components such as the transceiver 908, communication interfaces 912, the display 914, the input device 916, and the cursor control 918 are well known to the person skilled in the art and hence the explanation is thereof omitted.

Figure 10A:
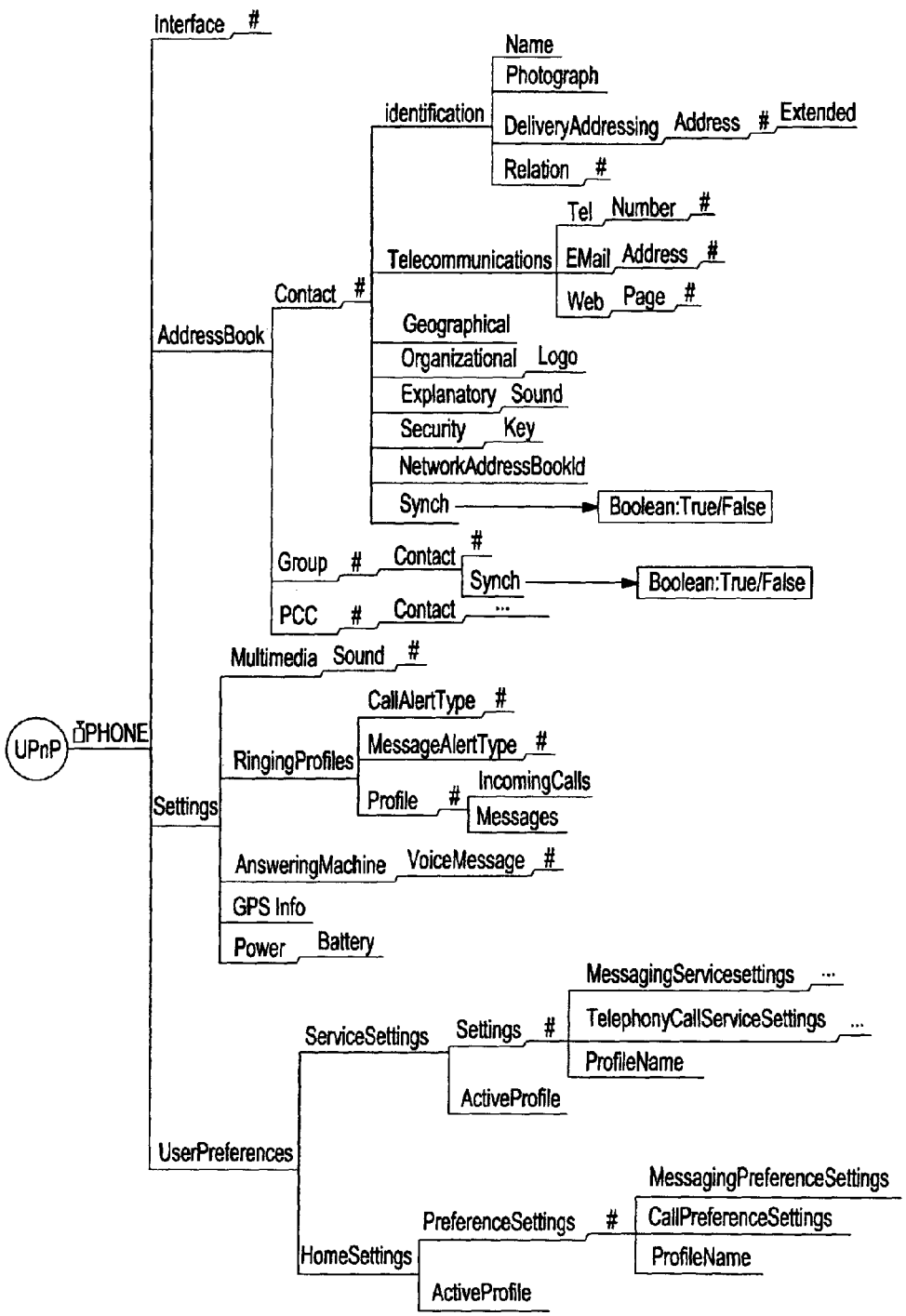
FIGS. 10a-10d illustrate schematic representations of a modified phone data model, according to one embodiment.

In accordance with the foregoing description, the TS 104 obtains contact information updates associated with a contact entry using a fetch or subscribe feature. Referring to FIG. 10A, a new element per contact entry is defined in the local address book 110/network address book 116 to subscribe to particular contact information. The element defined is child element of the "Contact" element of the address book. It is also possible that the TelCP user may subscribe to the group information. In such case, the new element is present under the group element.

Additionally, a new element called "synch" is defined. If the element 'synch' is true, then any updates for the particular contact is fetched and updated in the local address book 110. This is useful in the social networking case. In the case where the network address book 116 supports the contact subscription behavior and if the element 'synch' is made true then the contact subscription is automatically initiated using the network address book functionality (OMA ? CAB) via the network address book APIs.

Figure 10B:
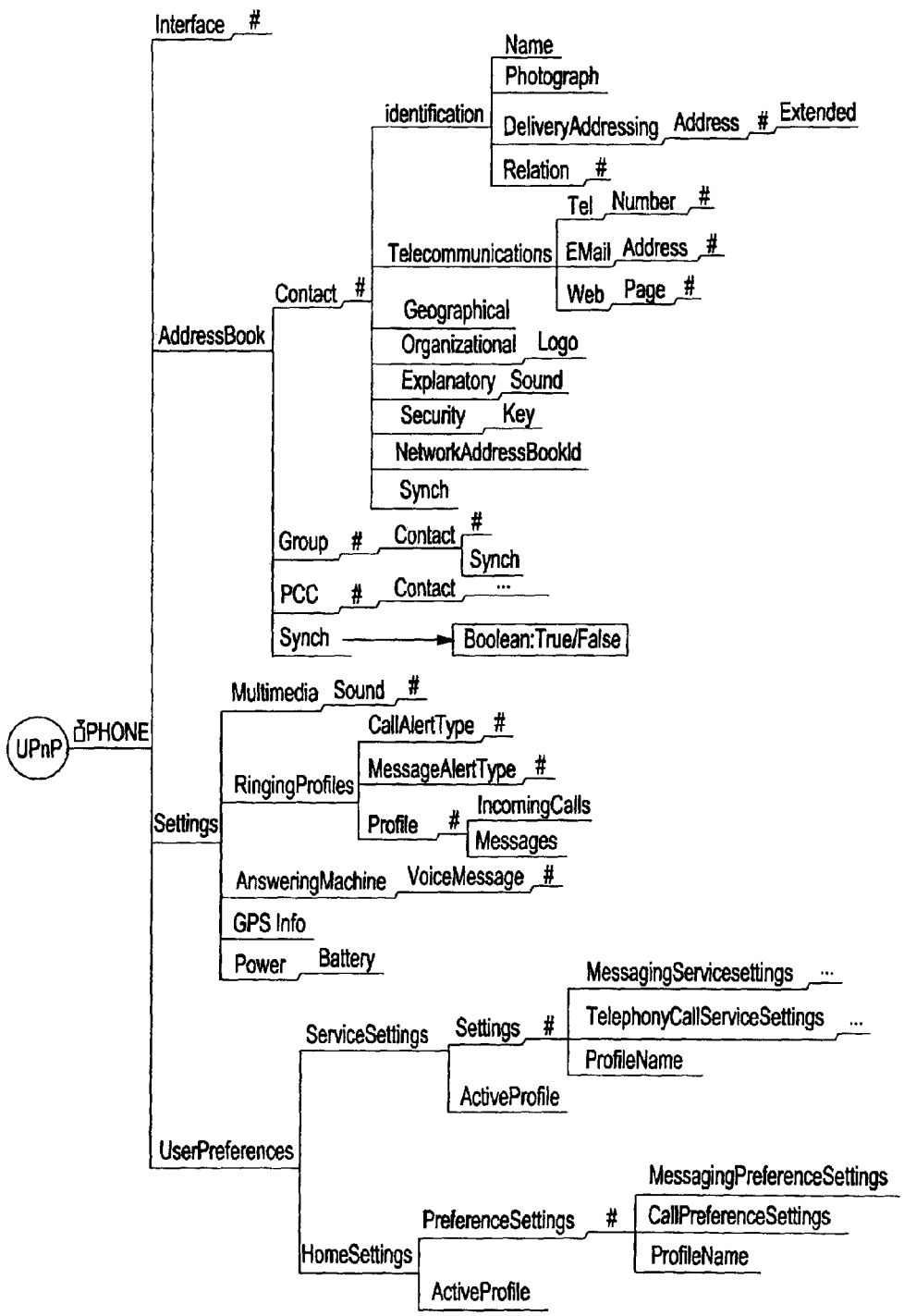

Referring to FIG. 10B, a single global element is defined as a child element of the local address book 110/network address book 116 to specify fetch or subscribe behavior. For example, the TelCP user may use a network address book identifier to subscribe or fetch the updated contact information for a particular contact entry.

Figure 11A:
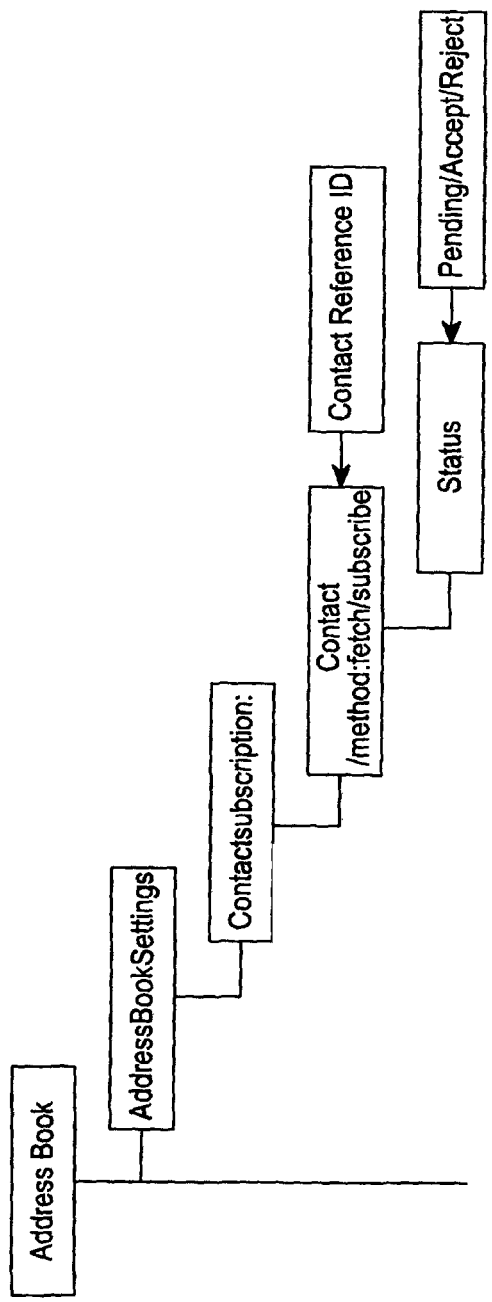
FIG. 11a illustrates a schema of an address book for subscribing contact information updates associated with a contact entry, according to one embodiment.

Referring to FIG. 11A, a new element 'addressbooksettings' is defined as the child element of the address book to subscribe contact information updates from the network address book. When the TelCP 102A wants to subscribe for contact information updates associated with a contact entry, then the TelCP 102A updates the address book setting element and include the subscription information in the "Contact Subscription" element. The "contact" element is used to identify the contact entry to be subscribed and "method" attribute is used to identify whether the contact information updates is to be fetched or subscribed. The "status" element is used for sending the status of the operation to the TelCP 102A. So, whenever the TelCP 102A sends a request for subscribing contact information updates of a contact entry, then the TS 104 attempts to subscribe for the requested updates associated with the contact entry and also update the status of the instruction in the "Status" element.

Figure 10C:
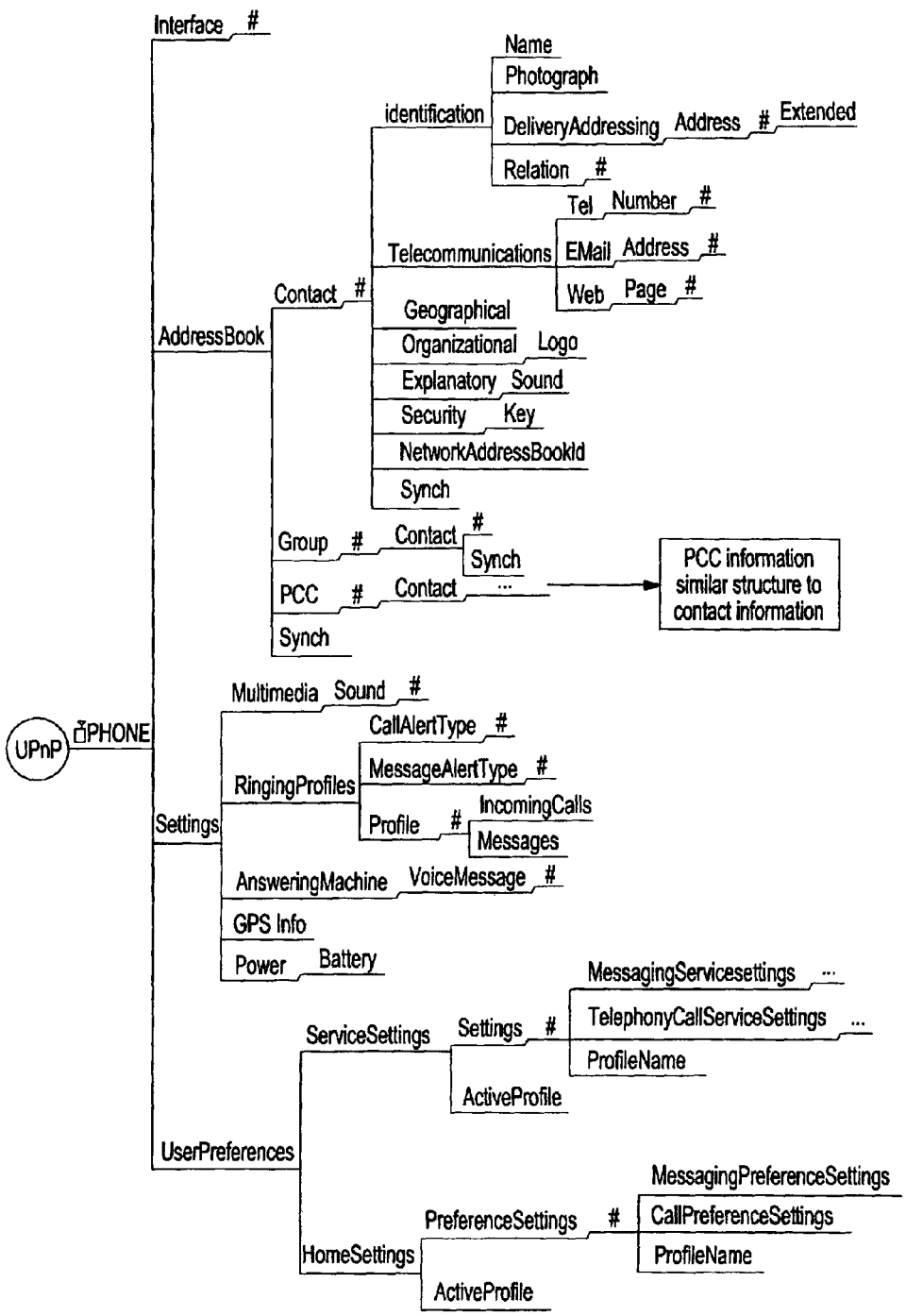
Figure 10D:
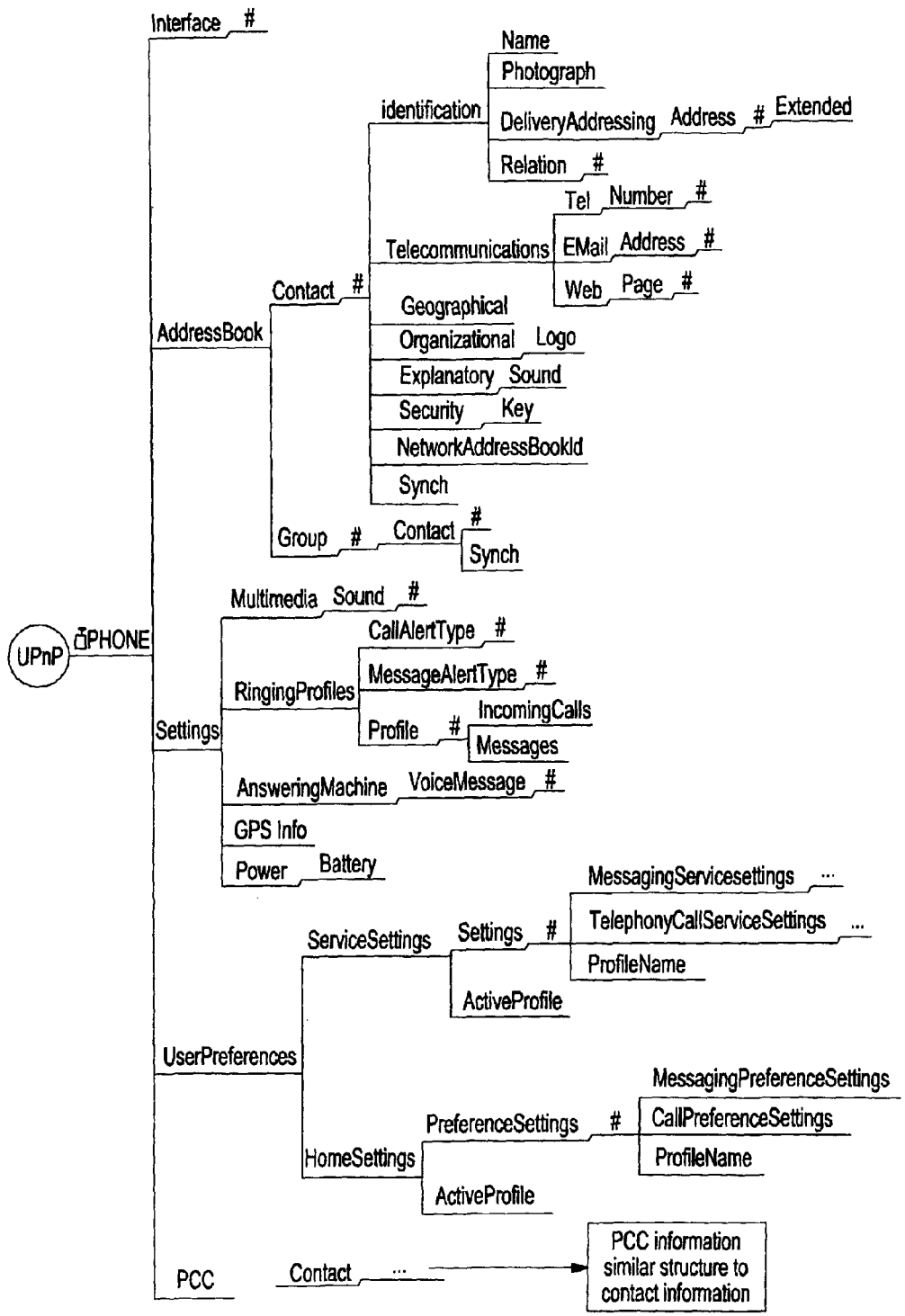

As shown in FIG. 10C, a new element as a 'child element' of address book is defined as "PCC". The new element contains all personal information of the TelCP user himself. Alternatively, the new element can be placed as a child element of the Phone Data Model as shown in FIG. 10D.

Figure 11B:
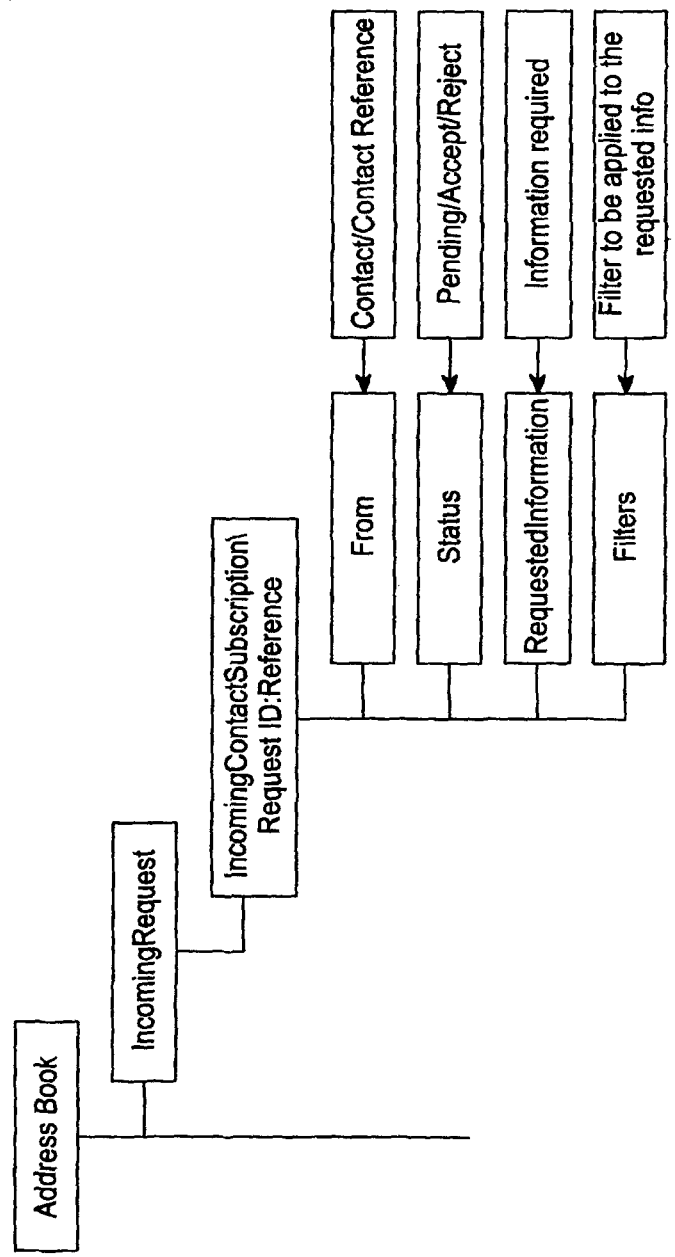
FIG. 11b illustrates a schema of an address book for subscribing to a Personal Contact Card of a TelCP user, according to one embodiment.

As shown in FIG. 11B, a new element "Incoming contact Subscription" is defined as a child element of the "Incoming Request". This element contains the incoming contact subscription request. The "From" element carry the originator of the subscribe request, "Status" carry the status of the request and "Requested Information" carry the request information required for the originator user.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

APPENDIX 'A'

```
<?xml version="1.0" encoding="UTF-8"?>
<SubscribedContacts>
<contact>
<contactID>ID of the Session</contactID>
<State>Pending</State>
<ContactInfo>Status of the session</ContactInfo>
</contact>
<!-- Any other contacts (if any) go here.-->
</SubscribedContacts>
```

APPENDIX 'B'

```
<?xml version="1.0" encoding="UTF-8"?>
<TargetContacts
xsi:schemaLocation="urn:schemas-upnp-org:phone:peer
http://www.upnp.org/schemas/phone/peer-v1.xsd"
xmlns:xsi="http://www.w3.org/2001/XMLSchema-instance"
xmlns:peer="urn:schemas-upnp-org:phone:peer">
<contact>
<peer:id>
The identifier of the Peer (e.g., phone number, etc.)
</peer:id>
<peer:name>A user friendly name for the Peer</peer:name>
<peer:contactInstanceId>
The instance identifier for a contact referred by the Peer
</peer:contactInstanceId>
<peer:groupInstanceId>
The instance identifier for a group referred by the Peer
</peer:groupInstanceId>
</contact>
</TargetContacts>
```

APPENDIX 'C'

```
<?xml version="1.0" encoding="UTF-8"?>
<AddressBook:incomingRequests
xmlns:AddressBook="urn:schemas-upnp-org:phone:addressbook
http://www.upnp.org/schemas/phone/addressbook-v1.xsd"
xmlns:xsi="http://www.w3.org/2001/XMLSchema-instance"
xmlns:peer="urn:schemas-upnp-org:phone:peer">
<request>
<type>PCC Share</type>
<reqID>123</reqID><fromcontactid>
<peer:id>contact id of the requester<peer:/id>
</fromcontactid>
<status>pending/Accepted/Rejected</status>
<note>informative text information, e.g. sharing jeyoung's mobile
number
</note>
<sharedinformationURL>URL pointing to additional information for e.g
shared contact information . . .
</sharedinformationURL>
</request>
<request>
<type>PCC Share</type>
<reqID>123</reqID>
<fromcontactid>
<peer:id>contact id of the requester<peer:/id>
</fromcontactid>
<status>pending</status>
<note>informative text information, e.g. sharing jeyoung's mobile
number
</note>
```

APPENDIX 'C'-continued

```
<sharedinformationURL>...</sharedinformationURL>
</request>
-<!--- Any other incoming requests currently active --->
</AddressBook:incomingRequests>
```

APPENDIX 'D'

```
<?xml version="1.0" encoding="UTF-8"?>
<cms:ContentPathList
  xmlns:cms="urn:schemas-upnp-org:dm:cms"
  xmlns:xsi="http://www.w3.org/2001/XMLSchema-instance"
  xsi:schemaLocation="urn:schemas-upnp-org:dm:cms
  http://www.upnp.org/schemas/dm/cms.xsd">
  <ContentPath>/UPnP/PHONE/AddressBook/PCC/</ContentPath>
</cms:ContentPathList>
```

APPENDIX 'E'

```
<?xml version="1.0" encoding="UTF-8"?>
<cms: ParameterValueList
  xmlns:cms="urn:schemas-upnp-org:dm:cms"
  xmlns:xsi="http://www.w3.org/2001/XMLSchema-instance"
  xsi:schemaLocation="urn:schemas-upnp-org:dm:cms
  http://www.upnp.org/schemas/dm/cms.xsd">
  <Parameter>
  <ParameterPath>/UPnP/PHONE/AddressBook/PCC/Identification/
FormattedName</ParameterPath>
  <Value>MAYURESH MADHUKAR PATIL</Value>
  </Parameter>
  <Parameter>
  <ParameterPath>/UPnP/PHONE/AddressBook/PCC/Identification/
NickName</ParameterPath>
  <Value>MAYU</Value>
  </Parameter>
  [...]
  <Parameter>
  <ParameterPath>/UPnP/PHONE/AddressBook/PCC/Explanatory/Sound/
Value</ParameterPath>
  <Value>MIICajCCAdOgAwIBAgICBEUwD...iBTeXN0</Value>
  </Parameter>
</cms:ParameterValueList>
```

The invention claimed is:

1. A method of a telephony server (TS) for sharing a personal contact card of a user of a telephony control point (TelCP) in a network environment with a remote party, comprising:
   receiving a request for a personal contact card associated with the user of the TelCP from a wireless area network (WAN) device;
   sending a notification regarding the request for personal contact card associated with the user to the TelCP;
   receiving a response message to the notification from the TelCP, wherein the response indicates whether the personal contact card is to be shared with the WAN device and type of information in the personal contact card to be shared with the WAN device;
   determining whether the personal contact card is to be shared with a user of the WAN device based on the received response;
   if the personal contact card is to be shared with the user of the WAN device, sending the personal contact card associated with the user of the TelCP to the WAN device; and
   if the personal contact card is not to be shared with the user of the WAN device, returning an error message to the WAN device.

2. The method of claim 1, further comprising:
   receiving a request for providing contact information updates associated with at least one contact entry from the TelCP;
   determining whether the requested contact information updates are associated with at least one contact entry in a local address book;
   obtaining the contact information updates from the local address book or a network address book based on the determined result; and
   providing the obtained contact information updates associated with the at least one contact entry to the TelCP.

3. The method of claim 2, wherein obtaining the contact information updates from the local address book or the network address book based on the determined result comprises:
   if the requested contact information updates are associated with the at least one contact entry in the local address book, obtaining the contact information updates associated with the at least one contact entry from the local address book; and
   if the requested contact information updates are not associated with the at least one contact entry in the local address book, obtaining the contact information updates associated with the at least one contact entry from the network address book.

4. The method of claim 3, further comprising:
   subscribing contact information updates associated with the contact entry in the network address book.

5. The method of claim 2, further comprising:
   determining whether there is any update made to the contact information associated with the at least one contact entry in the local address book; and
   fetching update associated with the contact information from the local address book associated with the at least one contact entry if the contact information is updated in the local address book.

6. The method of claim 2, further comprising:
   determining whether there is any update made to the contact information associated with the at least one contact entry in the network address book; and
   fetching update associated with the contact information from the network address book associated with the at least one contact entry if the contact information is updated.

7. The method of claim 6, wherein fetching update associated with the contact information from the network address book associated with the at least one contact entry comprises:
   storing the update associated with the contact information of the at least one contact entry in the local address book.

8. The method of claim 2, wherein contact information updates associated with the at least one contact entry comprises at least one of telephony number, status, display name, and display image.

9. A telephony server (TS) comprising:
   a communication interface;
   a processor; and
   memory coupled to the processor, wherein the memory includes a contact information management module configured for:
      receiving a request for a personal contact card associated with a user of a telephony control point (TelCP) from a wireless area network (WAN) device via the communication interface;
      sending a notification regarding the request for personal contact card associated with the user to the TelCP;
      receiving a response message to the notification from the TelCP, wherein the response indicates whether the personal contact card is to be shared with the WAN device and type of information in the personal contact card to be shared with the WAN device;

determining whether the personal contact card is to be shared with a user of the WAN device based on the received response;

if the personal contact card is to be shared with the user of the WAN device, sending the personal contact card associated with the user of the TelCP to the WAN device via the communication interface; and if the personal contact card is not to be shared with the user of the WAN device, returning an error message to the WAN device via the communication interface.

10. The (TS) of claim 9, wherein
the contact information management module is further configured for:
receiving a request for providing contact information updates associated with at least one contact entry from a telephony control point (TelCP);
determining whether the requested contact information updates are associated with at least one contact entry in a local address book;
obtaining the contact information updates from the local address book or a network address book based on the determined result; and
providing the obtained contact information updates associated with the at least one contact entry to the TelCP via the communication interface.

11. The TS of claim 10, wherein in obtaining the contact information updates from the local address book or the network address book based on the determined result, the contact information management module is configured for:
if the requested contact information updates are associated with the at least one contact entry in the local address book, obtaining the contact information updates associated with the at least one contact entry from the local address book; and
if the requested contact information updates not associated with the at least one contact entry in the local address book, obtaining the contact information updates associated with the at least one contact entry from the network address book.

12. The TS of claim 11, wherein the contact information management module is further configured for:
determining whether there is any update made to the contact information associated with the at least one contact entry in the local address book; and
fetching update associated with the contact information from the local address book associated with the at least one contact entry if the contact information is updated in the local address book.

13. The TS of claim 11, wherein the contact information management module is further configured for:
determining whether there is any update made to the contact information associated with the at least one contact entry in the network address book; and
fetching update associated with the contact information from the network address book associated with the at least one contact entry if the contact information is updated.

14. The TS of claim 13, wherein in fetching update associated with the contact information from the network address book associated with the at least one contact entry, the contact information management module is configured for:
storing the update associated with the contact information of the at least one contact entry in the local address book.

15. The TS of claim 11, wherein the contact information management module is further configured for:
subscribing contact information updates associated with the contact entry in the network address book.

16. The TS of claim 10, wherein contact information updates associated with the at least one contact entry comprises at least one of telephony number, status, display name, and display image.

17. A non-transitory computer-readable storage medium having instructions stored therein, that when executed by a telephony server (TS), cause the TS to perform a method comprising:
receiving a request for a personal contact card associated with a user of a telephony control point (TelCP) from a wireless area network (WAN) device via the communication interface;
sending a notification regarding the request for personal contact card associated with the user to the TelCP;
receiving a response message to the notification from the TelCP, wherein the response indicates whether the personal contact card is to be shared with the WAN device and type of information in the personal contact card to be shared with the WAN device;
determining whether the personal contact card is to be shared with a user of the WAN device based on the received response;
if the personal contact card is to be shared with the user of the WAN device, sending the personal contact card associated with the user of the TelCP to the WAN device via the communication interface; and
if the personal contact card is not to be shared with the user of the WAN device, returning an error message to the WAN device via the communication interface.

18. The non-transitory computer-readable storage medium of claim 17, wherein the method further comprises:
receiving a request for providing contact information updates associated with at least one contact entry from a telephony control point (TelCP);
determining whether the requested contact information updates are associated with at least one contact entry in a local address book;
obtaining the contact information updates from the local address book or a network address book based on the determined result; and
providing the obtained contact information updates associated with the at least one contact entry to the TelCP via the communication interface.

19. The non-transitory computer-readable storage medium of claim 18, wherein in obtaining the contact information updates from the local address book or the network address book based on the determined result, the method comprises:
if the requested contact information updates are associated with the at least one contact entry in the local address book, obtaining the contact information updates associated with the at least one contact entry from the local address book; and
if the requested contact information updates are not associated with the at least one contact entry in the local address book, obtaining the contact information updates associated with the at least one contact entry from the network address book.

20. The non-transitory computer-readable storage medium of claim 18, wherein contact information updates associated with the at least one contact entry comprises at least one of telephony number, status, display name, and display image.

* * * * *